United States Patent [19]
Gill et al.

[11] Patent Number: 4,976,465
[45] Date of Patent: Dec. 11, 1990

[54] EQUIPMENT FOR DELIVERING FLUID

[75] Inventors: David C. Gill, Keynsham; Eren Ali, London, both of United Kingdom

[73] Assignee: Nomix Manufacturing Company Limited, Bristol, United Kingdom

[21] Appl. No.: 221,284

[22] Filed: Jul. 19, 1988

[30] Foreign Application Priority Data

Jul. 20, 1987 [GB] United Kingdom ............... 8717048
Apr. 20, 1988 [GB] United Kingdom ............... 8809307

[51] Int. Cl.⁵ ............................................. B05B 3/10
[52] U.S. Cl. ................................... 239/224; 222/325; 222/386.5
[58] Field of Search ...................... 222/175, 325, 386.5, 222/183, 153, 130, 131, 105; 239/302, 223, 224

[56] References Cited

U.S. PATENT DOCUMENTS

| | | | |
|---|---|---|---|
| 1,006,217 | 10/1911 | Honour | 222/131 |
| 2,321,836 | 6/1943 | Marzo | 222/386.5 |
| 2,673,007 | 3/1954 | Debrie | 222/183 X |
| 3,790,121 | 7/1976 | Brandt | |
| 4,645,128 | 2/1987 | Graber | 239/223 |
| 4,778,086 | 10/1988 | Shibata et al. | 222/325 |
| 4,790,483 | 12/1988 | Gill | 239/224 |

FOREIGN PATENT DOCUMENTS

| | | |
|---|---|---|
| 68718 | 1/1983 | European Pat. Off. |
| 3517122 | 5/1986 | Fed. Rep. of Germany |
| 3535986 | 4/1987 | Fed. Rep. of Germany |
| 857786 | 1/1961 | United Kingdom |
| 897286 | 5/1962 | United Kingdom |
| 1075221 | 7/1967 | United Kingdom |
| 1076887 | 7/1967 | United Kingdom |
| 1173272 | 12/1969 | United Kingdom |
| 1410304 | 10/1975 | United Kingdom |
| 1434967 | 5/1976 | United Kingdom |
| 1472178 | 5/1977 | United Kingdom |
| 2001934 | 2/1979 | United Kingdom |
| 2013462 | 8/1979 | United Kingdom |
| 1586437 | 3/1981 | United Kingdom |
| WO82/03799 | 11/1982 | United Kingdom |
| 2111939A | 7/1983 | United Kingdom |
| 2130873 | 6/1984 | United Kingdom |
| 2163632 | 3/1986 | United Kingdom |
| 2171383A | 8/1986 | United Kingdom |
| 2131327 | 6/1987 | United Kingdom |
| 2197094 | 5/1988 | United Kingdom |

*Primary Examiner*—Kevin P. Shaver
*Attorney, Agent, or Firm*—Merchant, Gould, Smith, Edell, Welter & Schmidt

[57] ABSTRACT

Equipment for delivering fluids such as herbicides comprises a handset which supports delivery means such as a spraying head on a support tube 4. The handset receives a container 134 of fluid which is to be distributed, this container being received within a cavity 132 in the handset. The container is retained within the cavity 132 by latching elements 166 provided on a pivotable lever 162. As the container 134 is inserted into the cavity 132, the container engages a cam 168 which causes the lever 162 to pivot into the engaged position. An outlet fitting 150 provided on the container is automatically engaged with an inlet fitting communicating with a supply duct 10 for supplying fluid from the container to the spraying head.

13 Claims, 7 Drawing Sheets

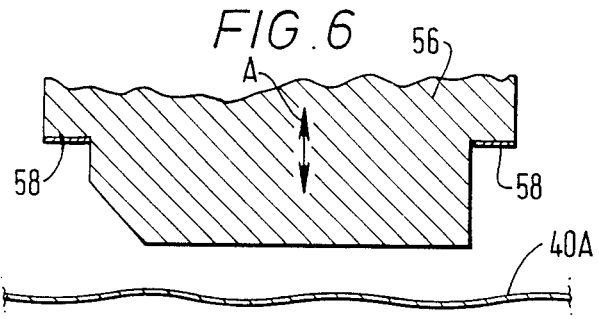
FIG. 6
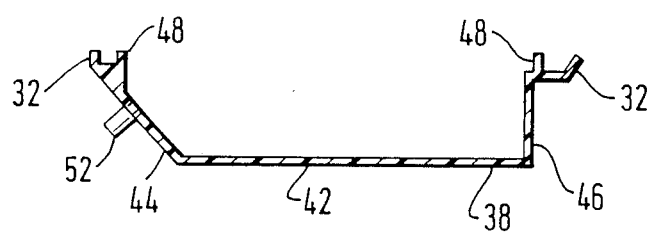
FIG. 7
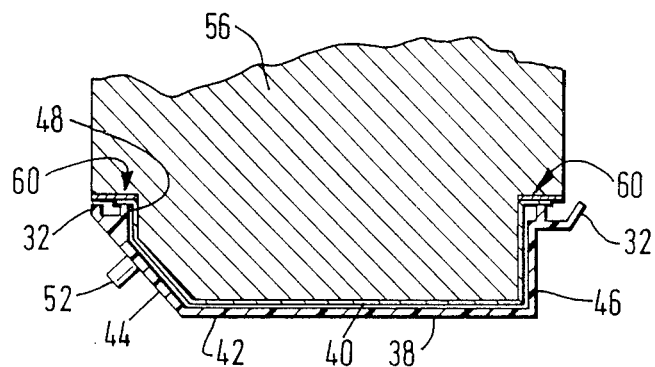

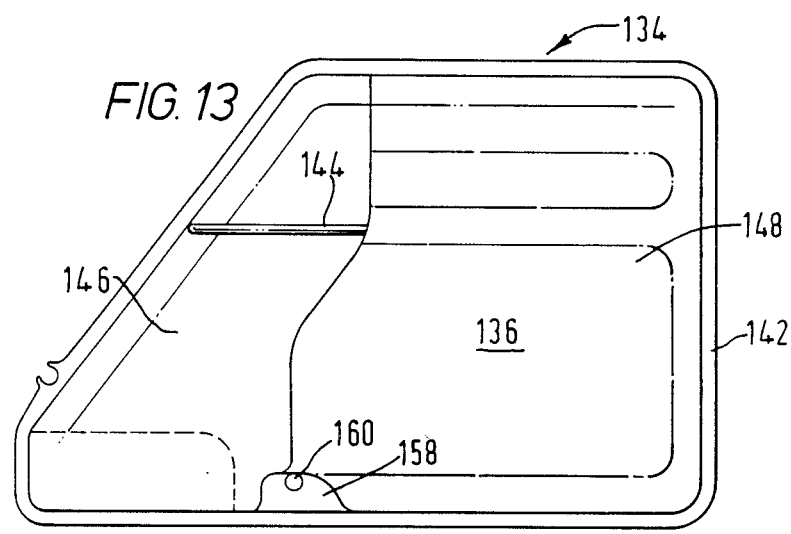
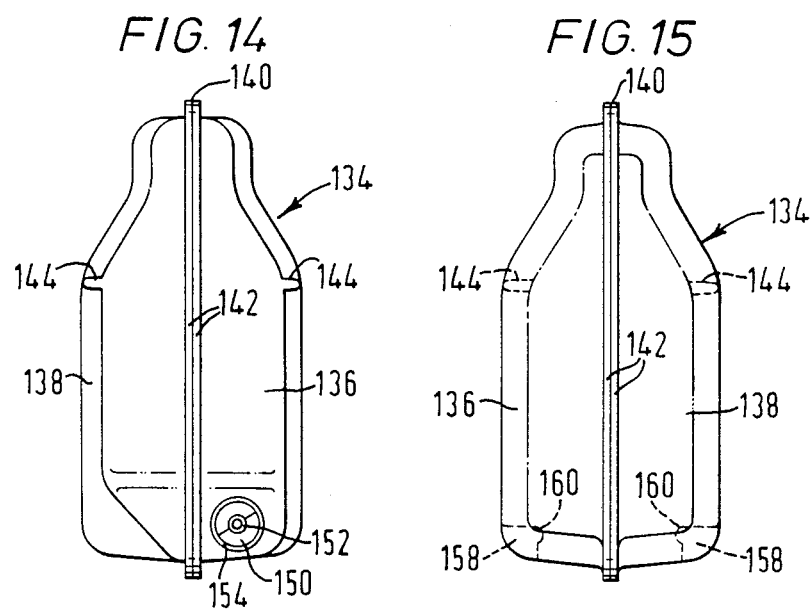

EQUIPMENT FOR DELIVERING FLUID

This invention relates to equipment for delivering fluids, and is particularly, although not exclusively, concerned with equipment for delivering herbicides over the ground.

There exist hand-held lances for delivering herbicide which comprise a handset and a delivery device, in the form of a spraying head, which is connected to the handset by a tubular support. The handset is held by the operator, and the tubular support enables him to position the delivery device just above the ground to be treated.

It is conventional for the herbicide to be supplied to the lance from a container which may be supported over the shoulder of the operator or carried in a backpack. One form of known container is a collapsible bag, for example of plastics material, which is accommodated in a rigid casing, such as a cardboard box. Such containers are similar to those which are sometimes used for packaging wine. This, however, is a relatively expensive form of packaging, since it is necessary not only to form and fill the bags, but also to form the cardboard boxes and then to insert the filled bags into the boxes. It is also known for the container to be in the form of a bottle having a screwthreaded neck which is engagable with a correspondingly screwthreaded socket provided on the lance, a duct extending from the socket to the delivery device. However, this arrangement is somewhat clumsy to use, since the bottle must be presented to the lance without a cap, and cannot be connected to the lance with a rapid action. Instead, both the relatively unwieldy lance and the bottle must be held by the operator while the neck of the bottle is screwed fully home into the socket. There is consequently a serious, danger that herbicide may be spilled during this operation. Such spillage is wasteful of a possibly expensive product, is hazardous to the operator, and may be destructive of plants on which it may unintentionally fall.

Hand-held lances of the types described above have so far been designed with professional users in mind. By "professional users" is meant local authorities and similar undertakings who need to treat relatively large areas of ground, using properly trained personnel. It is appropriate for such users to purchase the herbicide in relatively large quantities, for example in packages containing three litres. It would not make sense, however, for most domestic users to purchase herbicide in such large quantities when much smaller quantities, for example less than 0.5 litres, would be sufficient to treat the average-sized private garden. Furthermore, the dangers of spillage which are present with the second type of lance described above are even more likely to occur when the equipment is used by untrained amateurs.

According to a first aspect of the present invention, there is provided equipment for delivering fluid, comprising delivery means, having a delivery device, and a container of the fluid to be delivered, which container is secured to the delivery means by releasable latching means, the container having an outlet fitting which releasably engages an inlet fitting of a duct of the delivery means which extends from the inlet fitting to the delivery device.

With equipment in accordance with the first aspect of the present invention, it is possible to connect the container to the delivery means with a rapid action, minimising the possibility of spillage Indeed, in a preferred embodiment in accordance with the invention, the mere action of presenting the container to the delivery means in such a manner as to engage the outlet fitting with the inlet fitting is sufficient to cause the latching means to be operated to secure the container to the handset.

The latching means is preferably entirely separate from the outlet and inlet fittings, so that the weight of the container is not supported solely by the outlet and inlet fittings. This avoids unnecessary strain on these fittings, and consequently reduces the possibility of leakage.

In a preferred embodiment, the latching means is in the form of a pivotable lever carried by the handset. The lever engages the container with a snap action so that the lever is maintained in the retained position by the cooperation of the lever with the container.

The lever may have a cam with which the container makes contact as it is presented to the handset so as to engage the outlet fitting with the inlet fitting. This contact between the container and the cam causes the lever to be moved from a released position into a position in which it engages the container to secure the container with respect to the handset.

Preferably, the handset is provided with a cavity within which the container is at least partly received. The cavity and the container may be provided with cooperating formations which serve to guide the container with respect to the handset as the container is being inserted and withdrawn. This provision ensures reliable engagement between the outlet and the inlet fittings, which may be engagable with each other as a push fit.

A second aspect of the present invention stems from the desire to rationalise the packaging of herbicides and other fluids in containers which collapse as fluid flows from them, and to produce an economical and convenient form of herbicide package for relatively small quantities of herbicide.

According to the second aspect of the present invention, there is provided equipment for delivering liquids, the equipment comprising a delivery device and a container of the liquid to be delivered, which container is releasably received in a recess of the delivery device, the interior of the container being divided into two compartments by a flexible partition, one of which compartments contains the liquid and communicates with a supply duct of the delivery device through an outlet provided in the wall of the container at a region situated within the recess, and the other compartment communicating with the surroundings through a vent hole provided in the wall of the container at a region which is exposed to the surroundings.

Preferably, the flexible wall portion is of sufficient size and flexibility to be able to lie over substantially the entire internal surface of the wall of the container on one side of the flexible partition, so as to reduce the volume of the liquid-containing compartment substantially to nothing.

The wall of the container and the flexible partition may be made from compatible plastics materials, and may be secured to one another by welding.

In a preferred method of manufacturing a container in accordance with the invention a flexible partition is applied against an internal surface of a rigid wall component so that the wall component and the partition define a compartment of relatively small volume, the wall component and the partition then being secured to one another at a peripheral region in a fluid-tight manner, the flexible partition being deflectable away from the internal surface of the rigid wall component so as to increase the volume of the compartment. A second wall component may then be applied to the first wall component to enclose the flexible partition.

Upon filling of the container, for example through an opening provided in one of the wall components, the flexible partition moves away from the internal surface of that wall component to increase the volume of the compartment. Similarly, as fluid flows out of the container, the flexible partition moves back towards the inner surface of the rigid wall component.

Preferably, the fluid-tight connection between the flexible partition and the rigid wall component is achieved by welding, both elements being made from plastics material. Heating means, for performing the welding operation, may be attached to a former which engages the flexible partition to press it towards the inner surface of the rigid wall component. The former preferably has a shape corresponding closely to the internal configuration of the rigid wall component.

In a preferred embodiment, the equipment comprises a hand-held lance for delivering herbicide, the lance having a handset provided with a recess for receiving the container. The liquid supply duct extends from a position adjacent the recess to a delivery head of the lance, so that an outlet fitting of the container, when the container is inserted into the recess, engages the supply duct in order to allow liquid in the container to flow to the delivery head. In another embodiment, the container may be attached to the delivery head, instead of to the handset.

For a better understanding of the present invention, and to show how it may be carried into effect, reference will now be made, by way of example, to the accompanying drawings, in which:

FIGS. 6 to 9 represent four different stages during the manufacture and filling of the container shown in FIG. 5.

FIG. 12 is a rear view of the handset of FIGS. 10 and 11;

FIG. 13 is a side view of a container provided in the handset of FIGS. 10 to 12;

FIG. 14 is a front view of the container of FIG. 13; and

FIG. 15 is a rear view of the containers shown in FIGS. 13 and 14.

Figure 1:
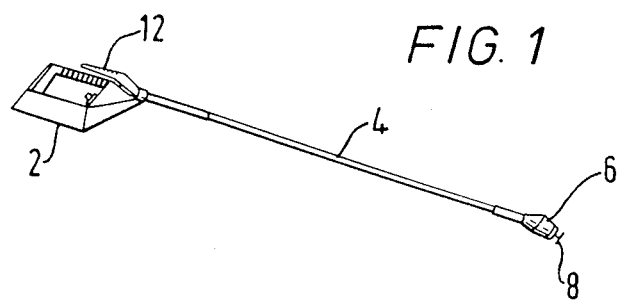
FIG. 1 shows a lance for delivering herbicide.

The lance shown in FIG. 1 comprises a handset 2 from which extends a rigid support member in the form of a tube 4. The tube 4 carries a delivery device in the form of a spraying head 6 which accommodates an electric motor (not shown) for driving a distribution element 8 in the form of a spinning disc.

Figure 2:
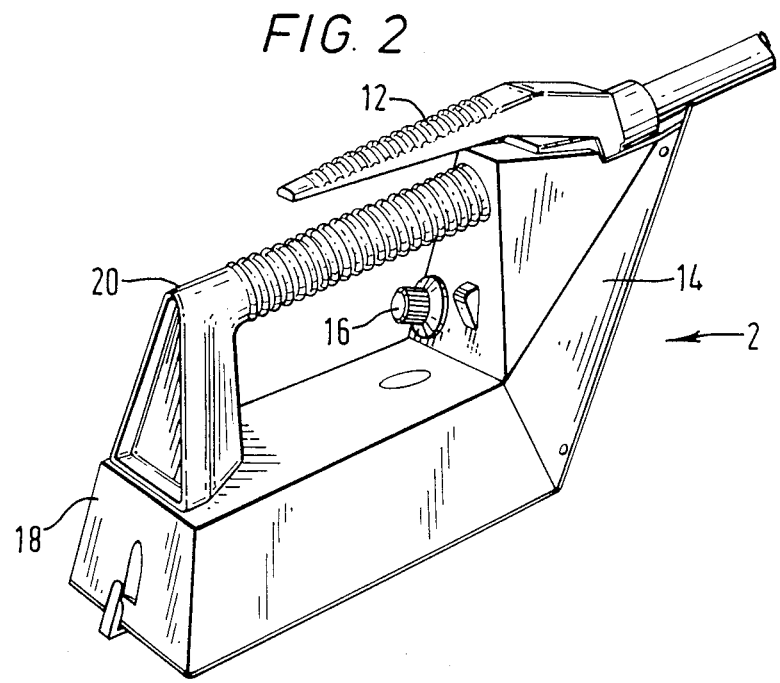
FIG. 2 is an enlarged view of a handset of the lance of FIG. 1.
Figure 3:
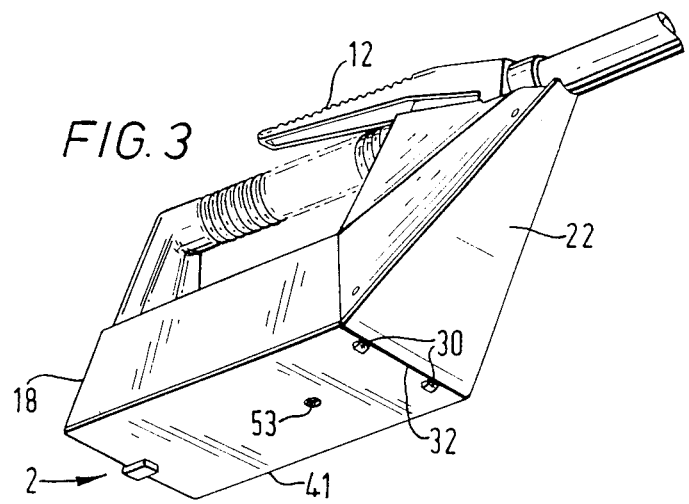
FIG. 3 shows the underneath of the handset shown in FIG. 2.
Figure 4:
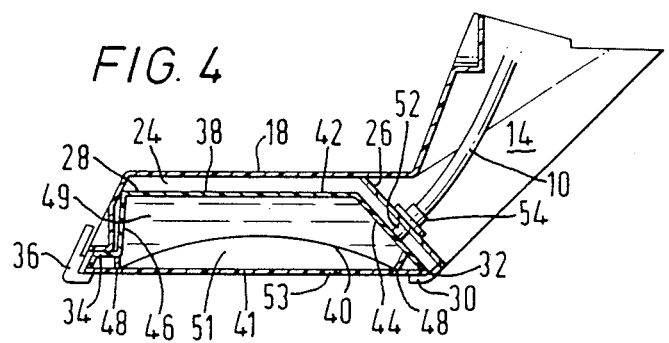
FIG. 4 is a longitudinal sectional view of the handset of FIGS. 2 and 3, with some parts omitted.
Figure 5:
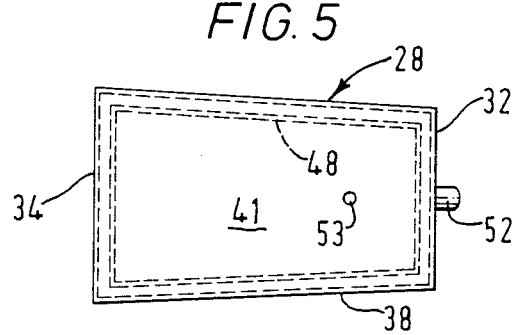
FIG. 5 is an underneath view of a herbicide container provided in the handset shown in FIGS. 2 to 4.

A duct 10 (FIG. 4) extends from the handset 2 through the tube 4 to the spraying head 6. The handset 2 is provided with a valve (not shown) which can be operated by means of a trigger 12. A battery providing the source of power for the motor in the head 6 is accommodated in the handset 2, for example in a compartment 14 at the forward end of the handset, as shown in FIGS. 2 to 4. The voltage applied to the motor in the head 6 can be controlled, in order to control the speed of the disc 8, by means of a control knob 16.

The handset 2 comprises a moulding 18 to which is connected a handle member 20. The forward end of the moulding 18 is closed by a panel 22 to define the compartment 14. The rearward part of the moulding 18 defines a cavity 24, which is separated from the compartment 14 by a partition 26. The cavity 24 accommodates a container 28 which contains the herbicide to be fed to the delivery head 6 through the tube 10. The container 28 is retained in the recess 24 by two lugs 30 which engage the forward edge region of the container 28. At the other end of the container 28, there is a latch 36 which engages the rear edge 34 of the container 28.

The container 28 comprises a rigid casing made up of a plastics moulding 38 and a cover panel 41. The moulding 38 is substantially in the form of a box with one open face, this open face being covered by the panel 41. Thus, in the orientation shown in FIG. 4, the moulding 38 has an upper wall 42, an inclined front wall 44, a rear wall 46 and two side walls. A peripheral rim 48 surrounds the open face of the moulding 38 at a position displaced inwardly slightly from the outer periphery 32 of the moulding 38. A flexible partition 40, made from plastics sheet material, is welded to the peripheral rim 48. The flexible partition 40 divides the interior of the casing 38, 41 into two compartments 49, 51.

The inclined wall 44 of the rigid component 38 is provided with an outlet fitting including a spigot 52 which provides communication between the compartment 49 and the outside of the container 28. As shown in FIG. 4, this spigot engages an inlet fitting 54 of the duct 10, in order to connect the compartment 49 of the container 28 with the duct 10. The end fitting 54 is secured to the partition 26.

The rigid cover panel 41 is secured to the moulding 38 by welding it to the outer periphery 32. The panel 41 has a small vent hole 53 to allow air to enter the compartment 51 so that the flexible partition 40 can move freely.

By way of example, the container 28, when full, may contain 400ml of herbicide, which, with modern herbicides, is an adequate quantity for most domestic gardening purposes.

For use, the container 28 is loaded into the cavity 24 by presenting the spigot 52 to the inlet fitting 54 and engaging these two components with each other by a push fit. The container 28 is then engaged with the lugs 30 and pivoted upwardly until the rear end meets the latch 36. The latch 36 may be formed with a cam surface so that it is carried outwardly by the container 28 and subsequently snaps back beneath the rear edge 34 to retain the container 28 in position. Alternatively the latch 36 may be retracted manually as the container 28 is inserted fully into the cavity 24.

The hole 53 may initially be closed, for example by adhesive tape or the like, which must be removed before use. The lance is intended to be used with the support tube 4 sloping downwardly from the handset 2 to the spraying head 6, and so herbicide will flow under gravity from the container 28 to the delivery head 6. The spinning disc 8 is rotated by the electric motor in the delivery head 6, under the control of the voltage regulator 16, and the herbicide, upon reaching the disc 8, is distributed by the disc 8 in the form of droplets. The flow of fluid through the duct 10 is controlled by means of the trigger 12.

As liquid flows from the container 28, the flexible partition 40 deflects inwardly of the compartment 49 in order to reduce the volume of the compartment 49. At the same time, air flows through the hole 53 to occupy the compartment 51 (FIG. 4). This avoids the need to provide venting means in the container 28 to permit air to enter the enclosure occupied by the fluid, without leakage through the venting means. When the container 28 is empty, the flexible partition 40 will be substantially in contact with the entire inner surface of the moulding 38. The inclined orientation of the front wall 44 assists in directing the last few millilitres of the fluid to the spigot 52. When the container 28 is completely empty, it is a simple matter to remove it from the cavity 24, by manual operation of the latch 36, and replace it by a full container. It will be appreciated that the containers 28 are not intended to be suitable for refilling by the user, but instead the containers 28 are intended to be replaced in the manner of a cartridge, in order to reduce the risk of operator contact with the herbicide or other fluid within the container 28.

Similarly, if the same lance is to be used for different forms of plant treatment, it is a simple matter to replace a container 28 of one fluid, for example a herbicide for killing weeds on paved areas, by a second container 28 containing another fluid, for example a formulation for treating lawns. Of course, it would normally be necessary to pass a cleaning fluid through the lance in order to remove all traces of the original herbicide and such a cleaning fluid may also be packaged in a similar container 28.

FIGS. 6 to 9 represent the manufacture and filling of the container 28. FIG. 6 shows the moulding 38, including the spigot 52, along with a separate sheet 40A destined to form the flexible partition 40. A former 56 is movable in the direction of the arrow A into and out of the moulding 38. The sheet 40A is disposed between the moulding 38 and the former 56 and, as the former 56 moves towards the moulding 38, the sheet 40A is pressed substantially into contact with the internal surface of the moulding 38, as shown in FIG. 7.

The former 56 is provided with an electric heating element 58 which extends around the former 56 and, when the former 56 is in the position shown in FIG. 7, the sheet 40A is clamped firmly between the heating element 58 and the peripheral wall 48. The heating element softens the plastics material of the sheet 40A and the wall 48, so causing the sheet 40A to become welded to the moulding 38, as shown at 60 in FIGS. 7 to 9. For added security, more than one peripheral wall 48 may be provided, so as to provide a corresponding number of concentric welds 60.

Figure 8:
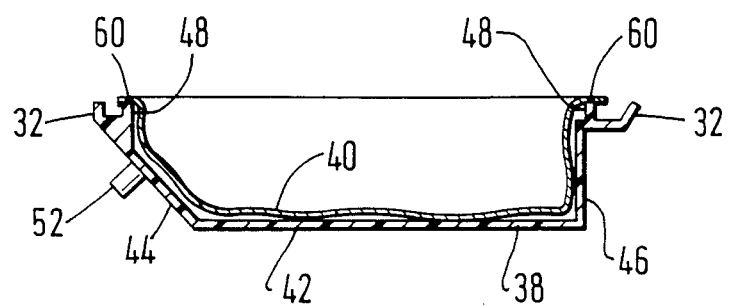
Figure 9:
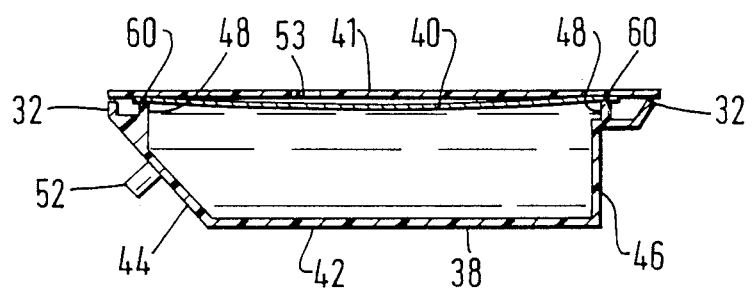

When the former 56 is withdrawn from the moulding 38, the flexible partition 40 remains int he collapsed condition as shown in FIG. 8. The panel 41 is then placed in position and welded to the outer periphery 32 of the moulding 38. Subsequent filling of the container, as shown in FIG. 9, causes the flexible partition 40 to be moved away from the internal surface of the moulding 38, displacing air through the vent hole 53. It will be appreciated that, in order to conform to the inner surface of the moulding 38 when the container is empty, the area of the flexible partition 40 will be greater than the area bounded by the weld 60, and consequently the flexible partition 40, although shown substantially flat in FIG. 9, may well be folded or otherwise crumpled when the container 28 is full.

Figure 10:
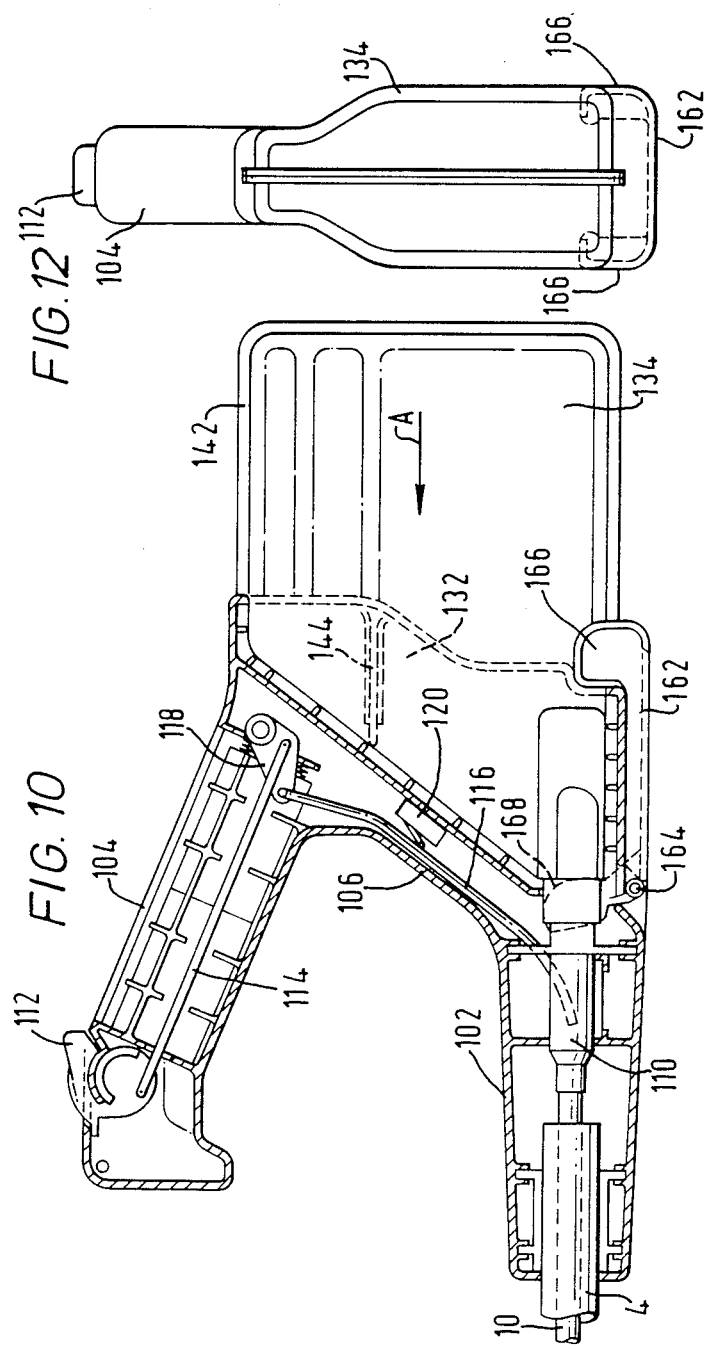
FIG. 10 is a sectioned side view of an alternative embodiment of a handset.

FIGS. 10 to 15 show a different embodiment of handset which may be used with the tube 4 and spraying head 6. The tube 4, as well as the duct 10, are represented in FIG. 10.

The handset shown in FIG. 10 comprises a somewhat U-shaped body made up of a first limb 102, which receives the tube 4, a second limb 104, which constitutes a handle member, and a connecting portion 106. The duct 10 enters the limb 102 and is connected to the outlet of a valve 110. The valve 110 is operated from a control pivot 112, provided on the handle 104, through a linkage comprising two rods 114 and 116 which are operatively connected to each other by a rocker 118. A microswitch 120 is provided on a wall of the connecting portion 106, and is actuated by displacement of the rod 116 when the control pivot 112 is operated. Thus, for operation of the lance, the control pivot 112 serves both to open the valve 110, to cause herbicide to flow to the spraying head, and to actuate the switch 120, to supply power to the motor in the spraying head for rotating the disc 8 (see FIG. 1). The power for this purpose is derived from batteries (not shown) accommodated in the handle 104.

Figure 11:
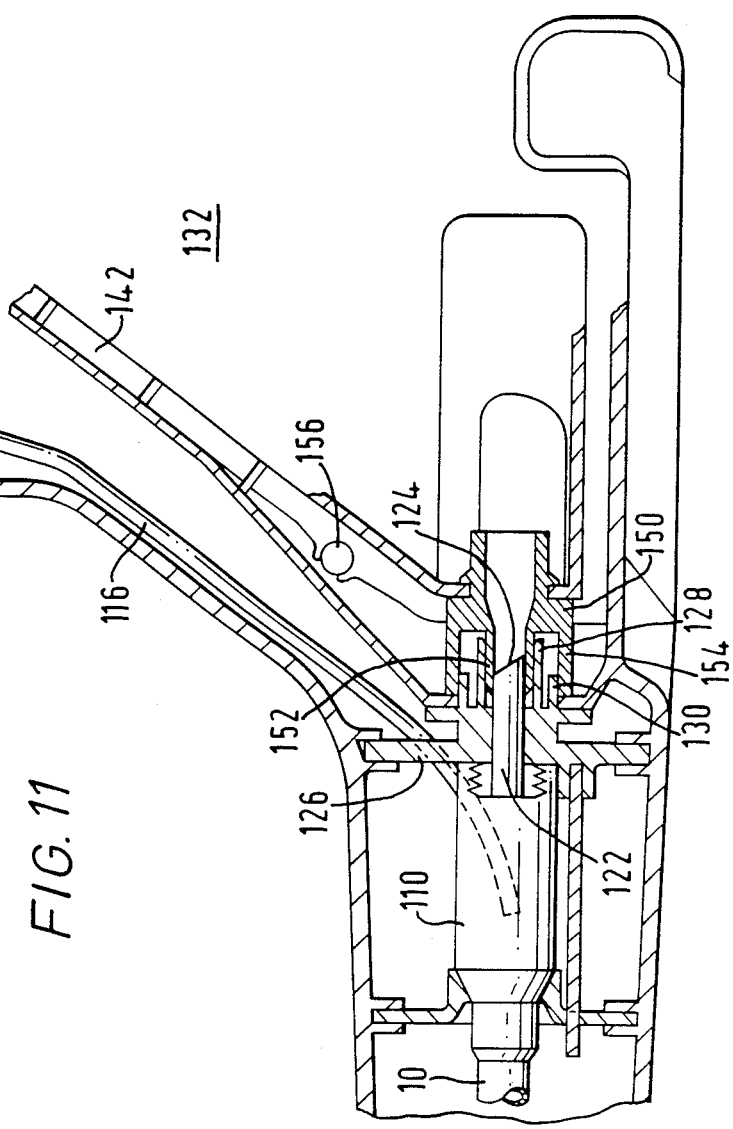
FIG. 11 is an enlarged fragmentary view of the handset of FIG. 10.

As shown in FIG. 11, the inlet to the valve 110 comprises a short length of metal pipe 122 having an oblique end 124, the purpose of which will be discussed later in this description. The tube 122 is secured within a partition 126 which is mounted in a fixed position with respect to the handset. The valve 110 is also secured to this partition 126.

The partition 126 is provided with an inlet fitting for the valve 110 and consequently for the tube 10. This inlet fitting comprises a tubular socket 128 surrounded by a skirt 130. The tube 122 projects into the socket 128.

The socket 128 and the skirt 130 project into a cavity 132 provided in the handset. This cavity 132 is occupied by the forward portion of a container 134 of herbicide. The rearward part of the container 134 projects from the cavity 132, as shown in FIG. 10. The container is shown in greater detail in FIGS. 3 to 15. It comprises two casing halves 136 and 138 which adjoin one another at a seam 140. The two casing halves 136, 138 are substantially mirror images of one another, and so the container as a whole is generally symmetrical about the seam 140.

The housing parts 136 and 138 each have a peripheral lip 142, these lips meeting at the seam 140 to provide a peripheral flange extending around the container 134. Furthermore, lateral ribs 144 are provided in the forward portion of the container 146. This forward portion 146 is somewhat narrower than the rear portion 148, with the result that the rear portion 148 of the container is generally flush with the outer surface of the region of the handset defining the cavity 132.

A flexible partition, corresponding to the flexible partition 40 of the embodiment shown in FIGS. 1 to 5, extends between the casing halves 136 and 138, being secured to these casing halves at the seam 140. The interior of the container is thus divided into two compartments, one of which is defined between the flexible partition and the casing half 136, and the other of which is defined between the flexible partition and the casing half 138.

The casing half 136 is provided with an outlet fitting 150 which, as seen in FIG. 11, comprises a spigot 152 for engagement within the socket 128, and a collar 154 for engagement around the skirt 130. The tube 122 enters the spigot 152.

The casing half 138 is provided with a vent hole (not shown) corresponding to the vent hole 53 shown in FIG. 4.

Although not shown in the drawings, the outlet fitting 150 is also provided with a stopper, connected by a flexible strap to the collar 154, for closing the spigot 152 when the container is removed from the cavity 132. A recess 156 may be provided in the flange 142 (see FIG. 11) for accommodating the stopper when the container is inserted into the recess 132.

The container has, on each side, a recess 158 which opens downwardly and outwardly. Each recess 158 has, on its inner surface, a dimple 160.

As shown in FIGS. 10 and 12, the handset is provided with latching means in the form of a lever 162. This lever is freely pivoted, about a pivot axis 164, to the portion 102 of the handset. The lever 162 has latch elements 166, which, when the container 134 is inserted into the recess 132, engage within the recesses 158 to retain the container 134 within the recess 132. These latch elements 166 are provided with projections (not shown) which engage with a snap action in the dimples 160 to retain the lever 162 in the position shown in FIG. 10.

The lever 162 is provided with a cam 168 which is positioned within the handset. This cam 168 is movable, upon displacement of the lever 162, into and out of the cavity 132.

The internal walls of the cavity 132 are provided with formations, such as grooves (not shown) for cooperation with the flange 142 and the ribs 144 to guide the container into and out of the cavity 132.

For operation, the container 134 is inserted into the cavity 132 in the direction of the arrow A in FIG. 10. During the initial stage of this insertion movement, the lever 162 is pivoted downwardly, for example under its own weight, from the position shown in FIG. 10, with the result that the cam 168 projects into the cavity 132. The container 134 is guided into the cavity 132 by cooperation between the formations within the cavity 132 on the one hand, and the flange 142 and ribs 144 on the other hand. This guidance directs the outlet fitting 150 of the container onto the inlet fitting 128, 130 within the handset, so that the spigot 152 enters the socket 128. Similarly, the tube 122 enters the spigot 152, and, if the container is being used for the first time, the oblique end face 124 of the tube 122 serves to cut through a partition provided within the spigot 152, to enable flow from the container, through the valve 110 (when opened), into the tube 10.

During the final stage of the movement of the container into the cavity 132, the forward end of the container engages the cam 168, and further displacement of the container 134 causes the lever to be displaced into the position shown in FIG. 10, in which the latch elements 166 engage in the recesses 158, the projections on these latch elements 166 snapping into the dimples 160, in order to retain the lever 162 in the engaged position. The final engagement of the latch elements 166 with the recesses 158 and the container 134 may be accomplished by pushing the container firmly inwardly of the cavity 132 in the direction of the arrow A. The proper engagement of the latch elements 166 with the container 134 provides a visual indication that the container is properly seated within the cavity 132, with the outlet fitting 150 cooperating properly with the inlet fitting 128, 130 of the tube 10.

The equipment may then be used by an operator, who grasps the handle 104 with one hand and manipulates the control pivot 112 with the thumb of that hand both to open the valve 110 and to actuate the switch 120. It will be appreciated that the centre of gravity of the container 134, whether it is full or empty, is behind the handle 104 and so counterbalances the weight of the tube 4 and the spraying head. This feature makes the lance less tiring to use for long periods.

At the end of a spraying operation, the container 134 can be removed from the cavity 132 by grasping the lever 162 and pulling it manually downwardly (as shown in FIG. 10). This releases the latch elements 166 from the recesses 158 and, at the same time, causes the cam 168 to push the container 134 out of the cavity 132, disengaging the outlet fitting 150 from the inlet fitting 128, 130. The spigot 152 can then be closed by means of the stopper previously retained in the recess 156.

It will be appreciated that the system described above enables containers of herbicide, or other fluid such as cleaner, to be rapidly and safely connected to, and disconnected from, the handset with minimal risk of spillage or leakage.

It will also be appreciated that, although, in the embodiments of the present invention which have been described with reference to the drawings, the container has been shown within the handset, it would be possible for the container to be fitted at other locations on the delivery equipment, for example on the spraying head 6.

We claim:

1. Filed delivery equipment comprising:
    a container of the fluid to be delivered;
    an outlet fitting provided on the container;
    a supporting member adapted to receive the container in a releasable manner;
    an inlet fitting provided on the supporting member and adapted for releasable connection to the outlet fitting of the container;
    a delivery device carried by the supporting member;
    a duct connecting the inlet fitting to the delivery device;
    a releasable latching device, mounted on the supporting member for movement about a pivot axis, for retaining the container with respect to the supporting member;
    the latching device comprising first and second arms extending from the pivot axis, the first arm carrying an abutment element which abuts the container and the second arm carrying a latching element which makes latching engagement with the container to prevent removable of the container from the supporting means, the latching device constructed and arranged such that displacement of the latching element out of latching engagement with the container causes pivotal movement of the latching device resulting in displacement of the abutment means to move the container in a direction away from the supporting member to disconnect the inlet fitting from the outlet fitting.

2. Equipment as claimed in claim 1, in which the container is provided with a recess at a position away from the outlet fitting, which recess is engaged by the latching element.

3. Equipment as claimed in claim 2, in which the latching device is freely pivotable with respect to the supporting member and engages within the recess with a snap action.

4. Equipment as claimed in claim 3, in which the latching device comprises two latching elements which engage respective recesses provided on opposite sides of the container.

5. Equipment as claimed in claim 1, in which the abutment element is operable by the container during displacement of the container to engage the outlet fitting with the inlet fitting, thereby to cause the latching element to be displaced positively into latching engagement with the container.

6. Equipment as claimed in claim 1 in which the container is received, at least partly, within a cavity provided in the support member.

7. Equipment as claimed in claim 6, in which the cavity has internal longitudinally extending formations which cooperate which complementary external formations on the container.

8. Equipment as claimed in claim 1, in which the outlet fitting and the inlet fitting are engageable with each other by a push fit.

9. Equipment as claimed in claim 1, in which the interior of the container is divided by a flexible partition into two compartments, one of which communicates with the outlet fitting, and the other of which communicates with the surroundings through a vent hole.

10. Equipment as claimed in claim 9, in which the all of the container comprises two compartments, between which the flexible partition is secured.

11. Equipment as claimed in claim 10, in which the two components are substantially symmetrical with respect to each other about the plane at which they meet.

12. Equipment as claimed in claim 1, in which the supporting member is provided with a handset on which the delivery device is supported, the container being secured to the handset.

13. Fluid delivery equipment comprising:
a handset;
a delivery device carried by the handset on an elongate carrying member;
a recess provided in the handset;
a fluid supply duct extending from the handset to the delivery device through the carrying member;
an inlet fitting on the fluid supply duct, which inlet fitting opens into the recess;
a manually operable valve provided on the handset for controlling the flow of fluid in the fluid supply duct;
a container for the fluid to be delivered, the container being releasably accommodated in the recess;
an outlet fitting provided on the container and releasably engaging the inlet fitting; and
releasable latch means retaining the container in the recess.

* * * * *